United States Patent
Kumar et al.

(10) Patent No.: US 12,487,365 B2
(45) Date of Patent: Dec. 2, 2025

(54) GNSS SPOOFING THREAT DETECTION AND CORRECTIVE ACTION

(71) Applicant: Honeywell International Inc., Charlotte, NC (US)

(72) Inventors: Perumal Kumar, Bangalore (IN); Sanjay Lenka, Bangalore (IN)

(73) Assignee: Honeywell International Inc., Charlotte, NC (US)

(*) Notice: Subject to any disclaimer, the term of this patent is extended or adjusted under 35 U.S.C. 154(b) by 422 days.

(21) Appl. No.: 18/048,636

(22) Filed: Oct. 21, 2022

(65) Prior Publication Data
US 2024/0085565 A1 Mar. 14, 2024

(30) Foreign Application Priority Data
Sep. 8, 2022 (IN) .............................. 202211051350

(51) Int. Cl.
*G01S 19/01* (2010.01)
*G01S 19/02* (2010.01)
*G01S 19/25* (2010.01)

(52) U.S. Cl.
CPC ............ *G01S 19/015* (2013.01); *G01S 19/02* (2013.01); *G01S 19/256* (2013.01)

(58) Field of Classification Search
CPC ....... G01S 19/015; G01S 19/02; G01S 19/256
(Continued)

(56) References Cited

U.S. PATENT DOCUMENTS 9,453,903 B2  9/2016  Robinson
10,725,182 B2  7/2020  Boyer et al.
(Continued)

FOREIGN PATENT DOCUMENTS

EP  3555665 A1  10/2019
EP  3759520 A1  1/2021
(Continued)

OTHER PUBLICATIONS

European Patent Office, "Extended European Search Report", from EP Application No. 23192449.9, from Foreign Counterpart to U.S. Appl. No. 18/048,636, filed Feb. 1, 2024, pp. 1 through 16, Published: EP.
(Continued)

*Primary Examiner* — William Kelleher
*Assistant Examiner* — Samarina Makhdoom
(74) *Attorney, Agent, or Firm* — Fogg & Powers LLC (57) ABSTRACT

A method for detecting spoofing comprises monitoring GNSS satellite signals with a GNSS receiver; obtaining current time, current orbital information values, Doppler shift, and/or dilution of precision from the GNSS receiver, with the current orbital information values comprising orbital position with respect to a current position of the GNSS receiver; retrieving past orbital information values comprising orbital position, and calculating predicted orbital information values based on the past orbital information values, with respect to the current time from the receiver, with the predicted orbital information values comprising orbital position with respect to the current position of the receiver. The method compares the predicted orbital information values, Doppler shift, and/or dilution of precision, with the current orbital information values to obtain discriminator values; determines whether the discriminator values are greater than threshold levels; and outputs a spoofing alert signal when the discriminator values are greater than the threshold levels.

20 Claims, 3 Drawing Sheets

(58) Field of Classification Search
USPC .......................................................... 342/352
See application file for complete search history.

(56) References Cited

U.S. PATENT DOCUMENTS

| | | |
|---|---|---|
| 11,099,276 B2 | 8/2021 | Lentz et al. |
| 11,163,068 B2 | 11/2021 | Balog et al. |
| 11,313,973 B2 | 4/2022 | Molina-Markham |
| 2008/0111738 A1 | 5/2008 | Han |
| 2011/0068973 A1 | 3/2011 | Humphreys et al. |
| 2011/0285586 A1 | 11/2011 | Ferguson |
| 2013/0251150 A1* | 9/2013 | Chassagne ............ H04L 63/123 380/270 |
| 2016/0377726 A1 | 12/2016 | Schipper et al. |
| 2017/0070971 A1 | 3/2017 | Wietfeldt et al. |
| 2017/0357009 A1* | 12/2017 | Raab ..................... G01S 19/35 |
| 2019/0377094 A1* | 12/2019 | Lentz ..................... G01S 19/21 |
| 2020/0379122 A1* | 12/2020 | Tontiruttananon .... G01S 19/215 |
| 2021/0311202 A1* | 10/2021 | Reis ...................... G01S 19/421 |
| 2021/0333409 A1 | 10/2021 | Cao et al. |
| 2021/0333411 A1 | 10/2021 | Gum et al. |
| 2022/0082704 A1 | 3/2022 | Lemke et al. |
| 2022/0221587 A1* | 7/2022 | Tuck ..................... G01S 19/03 |
| 2022/0276388 A1* | 9/2022 | Skupin ................... G01S 19/14 |

FOREIGN PATENT DOCUMENTS

| | | |
|---|---|---|
| KR | 101963580 B1 | 3/2019 |
| KR | 102350194 B1 | 1/2022 |
| WO | 2022026793 A1 | 2/2022 |

OTHER PUBLICATIONS

FAA, "Performance Based Navigation, Navigation Strategy 2016" Feb. 12, 2016, downloaded from www.faa.gov on Jul. 5, 2022, Page(s) Cover through 35, Published: US.

Fernandez, Bill, "Performance Based Navigation (PBN) National Airspace System (NAS) Navigation Strategy 2016-2030", FAA presentation, Aeronautical Charting Forum, Apr. 27, 2016, Page(s) Cover through 15, Published: US.

* cited by examiner

GNSS SPOOFING THREAT DETECTION AND CORRECTIVE ACTION

CROSS-REFERENCE TO RELATED APPLICATION

This application claims priority to Indian Provisional Application No. 202211051350 filed on Sep. 8, 2022, the contents of which are incorporated by reference herein in their entirety.

BACKGROUND

Global navigation satellite system (GNSS) spoofing results in the incorrect annunciation of actual GNSS receiver position outputs for a vehicle such as an aircraft, thereby resulting in potential hazards to avionics safety. The GNSS receivers typically have a 24 channel receiver design and face challenges due to spoofing threats, which leads the GNSS receivers to output erroneous position outputs. This potential hazard can result in aircraft being off track during flight, or pose hazard threats that can be catastrophic during an aircraft landing approach.

The GNSS receiver outputs are consumed by multiple aircraft critical systems such as the Automatic Dependent Surveillance-Broadcast (ADS-B), the Enhanced Ground Proximity Warning System (EGPWS), the terrain awareness and warning system (TAWS), flight control systems, and the like. Also, the required navigation performance (RNP) of an aircraft can be deteriorated due to spoofing events. Thus, any spoofing threats need to be detected to ensure that the GNSS receivers are not susceptible to such spoofing threats. In addition, there is a need for spoofing events to be identified in the locations where they exist so that corrective actions can be taken.

SUMMARY

A method for detecting satellite signal spoofing comprises monitoring one or more satellite signals from one or more satellites with at least one satellite receiver; and obtaining a current time and one or more current orbital information values from the at least one satellite receiver, wherein the current one or more orbital information values comprise satellite orbital position, Doppler shift, or dilution of precision, with respect to a current position of the at least one satellite receiver. The method further comprises retrieving one or more past orbital information values, wherein the one or more past orbital information values comprise satellite orbital position, Doppler shift, or dilution of precision; and calculating one or more predicted orbital information values based on the one or more past orbital information values, with respect to the current time from the at least one satellite receiver, wherein the one or more predicted orbital information values comprise satellite orbital position, Doppler shift, or dilution of precision, with respect to the current position of the at least one satellite receiver. The method compares the one or more predicted orbital information values with the one or more current orbital information values to obtain one or more discriminator values; determines whether the one or more discriminator values are greater than one or more respective threshold levels; and outputs a spoofing alert signal when the one or more discriminator values are greater than the one or more respective threshold levels.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method and system for global navigation satellite system (GNSS) spoofing threat detection and corrective action, are described herein.

The present method and system provide for the detection and mitigation of spoofing threats to GNSS receivers, such as Global Positioning System (GPS) receivers. In addition, the present approach can be adapted for spoofing detection in other GNSS implementations, such as for GALILEO satellites, BEIDOU satellites, and GLONASS satellites.

The present approach provides for improved navigation of various vehicles, such as ground vehicles, aerial vehicles, and sea vehicles. In particular, the method and system can be applied in various aircraft, such as a manned aircraft, a helicopter, an unmanned aerial vehicle (UAV), an unmanned aircraft system (UAS) vehicle, an urban air mobility (UAM) vehicle, a drone, or the like.

Further, the present method provides for spoofing events to be identified in the locations where they exist. This allows alerts to be broadcast to ensure that other vehicle systems that host GNSS receivers, as well as regulatory authorities, are aware of the GNSS spoofing so that corrective actions can be taken. The broadcasted alerts can ensure safety as vehicles can avoid GNSS usage in vulnerable locations.

For example, the present approach can provide improved safety measures for vehicles using GNSS receivers, as spoofing can lead to catastrophic hazards for a Ground Based Augmentation System (GBAS) Landing System (GLS), or Localizer Performance with Vertical guidance (LPV) landing approaches.

The present methods can also be applied for use with Satellite Based Augmentation System (SBAS) satellites, which are geostationary satellite systems (e.g., Wide Area Augmentation System (WARS), GPS-Aided GEO Augmented Navigation (GAGAN), and the European Geostationary Navigation Overlay Service (EGNOS), which provide GNSS augmentation corrections. Reference stations, which are geographically distributed throughout the SBAS service area, receive GNSS signals and forward them to a master station. Since the locations of the reference stations are accurately known, the master station can accurately calculate wide-area corrections.

In various embodiments, the present GNSS spoofing detection algorithms can be ported into a flight management system (FMS) of an aircraft, can be hosted in at least one GNSS receiver onboard a vehicle or in a ground station, or can be hosted in a standalone processor that is coupled to a GNSS receiver. In addition, the output of the spoofing detection can be displayed such as on a cockpit display, thus alerting a user such as a pilot so that corrective action can be taken.

Also, when the orbital information and position is computed using satellite data from other sources, such as retrieving data from the cloud, from GNSS receivers on other aircraft, or from ground stations such as through datalink, the actual position can be computed and thus seamless navigation and RNP can be assured.

GNSS Data

Real-time orbital information of GNSS satellites is transmitted by the satellites in terms of navigation messages via what is known as "ephemeris" data. This data is consumed by GNSS receivers for computing accurate position, velocity, and time. The ephemeris data provides orbital information about satellite location, timing, and health, and is used by GNSS receivers to estimate location relative to the satellites and thus their position on or above Earth. The ephemeris data can also be used to predict future satellite positions/coordinates.

In the present method, orbital information such as satellite orbital position and Doppler shift from the satellites can be monitored consistently at regular time intervals to detect any spoofing that has occurred. The orbital information received through ephemeris data will not result in a significant change to the position computed, when orbital information not older than seven days is used for appropriate computation of orbital parameters (e.g., position). Thus, orbital information (e.g., up to seven days old) can be used for processing to arrive at predicted orbital information.

The orbital information used for comparison can be sourced from older, stored data (one to seven days old), or from a current International GPS Service (IGS). The GNSS receiver is configured to receive the orbital information, and the same can be broadcasted/communicated to a ground station, where the orbital information can be compared with accurate orbital information from ground GPS centers. If there is any mismatch, then potential spoofing in that pertinent location can be annunciated.

The orbital information can be stored in various timelines ranging from one day to seven day old data, which can be used to predict the satellite positions using the current receiver time. Predicted orbits and positions of GPS satellites can be generated by numerically integrating and using stored ephemeris data at the various timelines. A satellite orbital information model can be validated from the received GPS signals and the existing stored satellite orbital information can be updated at regular fixed intervals. In addition, current orbital information values can be broadcast to other users that are airborne or on the ground.

Doppler Shift

The Doppler shift is produced due to the relative motion of a GNSS satellite with respect to the GNSS receiver. The Doppler frequency increases as the satellite approaches the receiver, and the Doppler frequency decreases as the satellite recedes from the receiver. The Doppler shifts for satellites can be computed/predicted based on orbital models stored at the receiver, with respect to the current receiver time, which can then be compared with the live broadcasted GNSS signals received by the receiver. The Doppler equation can be expressed as:

$$f_r = f_s(1 - V_r/c)$$

where, $f_r$ is the received frequency by the receiver;

$f_s$ is the frequency transmitted by the satellite;

$V_r$ is the relative velocity between the receiver and the satellite; and c is the speed of light.

The Doppler shifts due to the relative motion between the satellite and the receiver are typically at a maximum value of about 30-60 Hz per minute. A spoofer system is usually on the ground and can be moving or static, but the velocity of the spoofer system is much less than the satellite velocity (e.g., approximately 3 km/s). Thus, the signal coming from the spoofer system will have a different Doppler shift than the signals coming from the satellites, for an unsophisticated spoofer (because of inaccuracies of GNSS spoofing devices). The GNSS receiver can declare that it is spoofed if the Doppler shift differs and exceeds a threshold from the predicted Doppler shift for each satellite based on the data from the predicted satellite orbital information model stored in the receiver.

In addition, the GNSS receiver can propagate the satellite positions and Doppler frequency using the stored satellite orbital information and the receiver's current time calculated from the GNSS signals. The current satellite positions generated from the GNSS signals can then compared with the predicted satellite positions from the stored orbital information. The difference value exceeding the threshold indicates a spoofing condition.

Further details regarding the present method and system are described as follows and with reference to the drawings.

Figure 1:
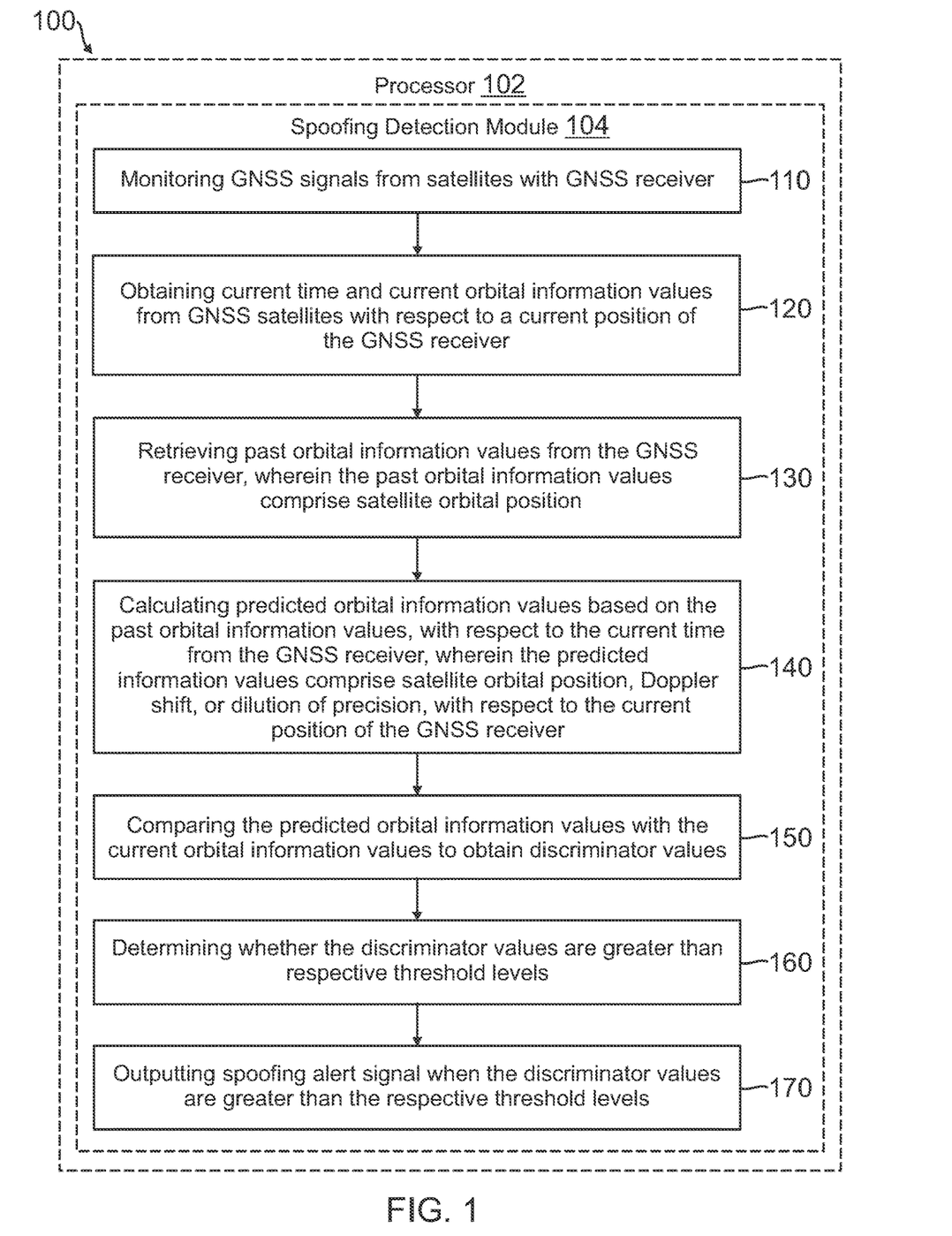
FIG. 1 is a block diagram of a system for spoofing detection, according to one embodiment.

FIG. 1 illustrates a system 100 for spoofing detection, according to one embodiment. The system 100 includes at least one processor 102, and a spoofing detection module 104 operatively coupled with processor 102. The processor 102 can be in a FMS of an aircraft, in a GNSS receiver, or can be a standalone processor, for example.

The spoofing detection module 104 includes instructions, executable by processor 102, to perform a method that comprises monitoring one or more GNSS signals from one or more satellites with a GNSS receiver (block 110). The method obtains a current time and one or more current orbital information values from the GNSS receiver, with the current orbital information values comprising satellite orbital position, Doppler shift, or dilution of precision, with respect to a current position of the GNSS receiver (block 120). The method retrieves one or more past orbital information values from the GNSS receiver, with the past orbital information values comprising satellite orbital position, or dilution of precision (block 130). The method then calculates one or more predicted orbital information values based on the one or more past orbital information values, with respect to the current time from the GNSS receiver, with the predicted orbital information values comprising satellite orbital position, Doppler shift, or dilution of precision, with respect to the current position of the GNSS receiver (block 140). The method compares the one or more predicted orbital information values with the one or more current orbital information values to obtain one or more discriminator values (block 150), and determines whether the one or more discriminator values are greater than one or more respective threshold levels (block 160). A spoofing alert signal is then output (broadcasted) when the one or more discriminator values are greater than the one or more respective threshold levels (block 170).

Figure 2:
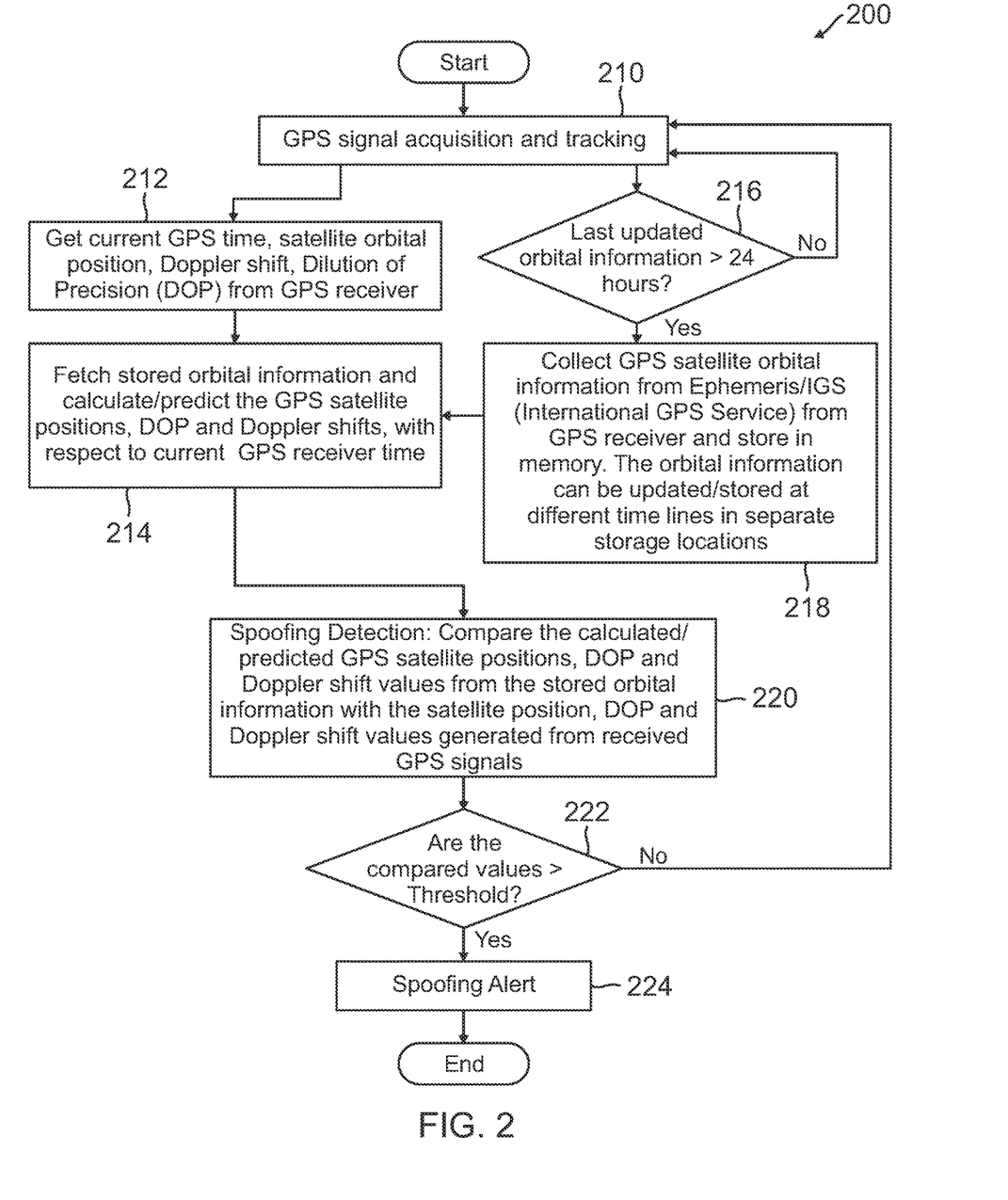
FIG. 2 is a flow diagram of a method for spoofing detection, according to an example implementation.

FIG. 2 is a flow diagram of a method 200 for GPS spoofing detection, according to an example implementation. At the start method 200 performs GPS signal acquisition and tracking (block 210), such as by monitoring GPS signals with a GPS receiver. The method 200 gets a current GPS time, satellite orbital position information, Doppler shift, and dilution of precision (DOP) from the GPS receiver (block 212). The method 200 then fetches stored orbital information and calculates/predicts the GPS satellite positions, DOP, and Doppler shifts, with respect to the current GPS receiver time (block 214).

During the GPS signal acquisition and tracking (block 210), method 200 determines if the last updated orbital information was collected greater than 24 hours (1 day) ago (block 216). If not, method 200 continues the GPS signal acquisition and tracking. If the last updated orbital information was collected greater than 24 hours ago, then method 200 collects GPS satellite orbital information, such as from ephemeris or IGS (International GPS Service), from the GPS receiver and stores the orbital information in memory (block 218). The orbital information can be updated and stored at different timelines (e.g., 1 to 7 days) in separate storage locations of the memory. This stored orbital information is made available to method 200 as described above (block 214). For example, past orbital information values can be retrieved from a cloud-based storage database.

The method 200 performs spoofing detection by comparing the calculated/predicted the GPS satellite position, DOP, and Doppler shift values from the stored orbital information with the current satellite position, DOP, and Doppler shift values generated from the received GPS signals by the GPS receiver (block 220). The method 200 then determines if the compared values from the stored orbital information and the received GPS signals are greater than a threshold (block 222). If not, spoofing is not detected and method 200 returns to the GPS signal acquisition and tracking (block 210). If the compared values are greater than the threshold, method 200 generates a spoofing alert signal (block 224), which can be broadcasted to other GPS users. For example, the spoofing alert signal can be broadcasted in vulnerable areas where spoofing is detected. In addition, a cloud-based storage database can contain geographical locations where the GNSS spoofing is detected.

Figure 3:
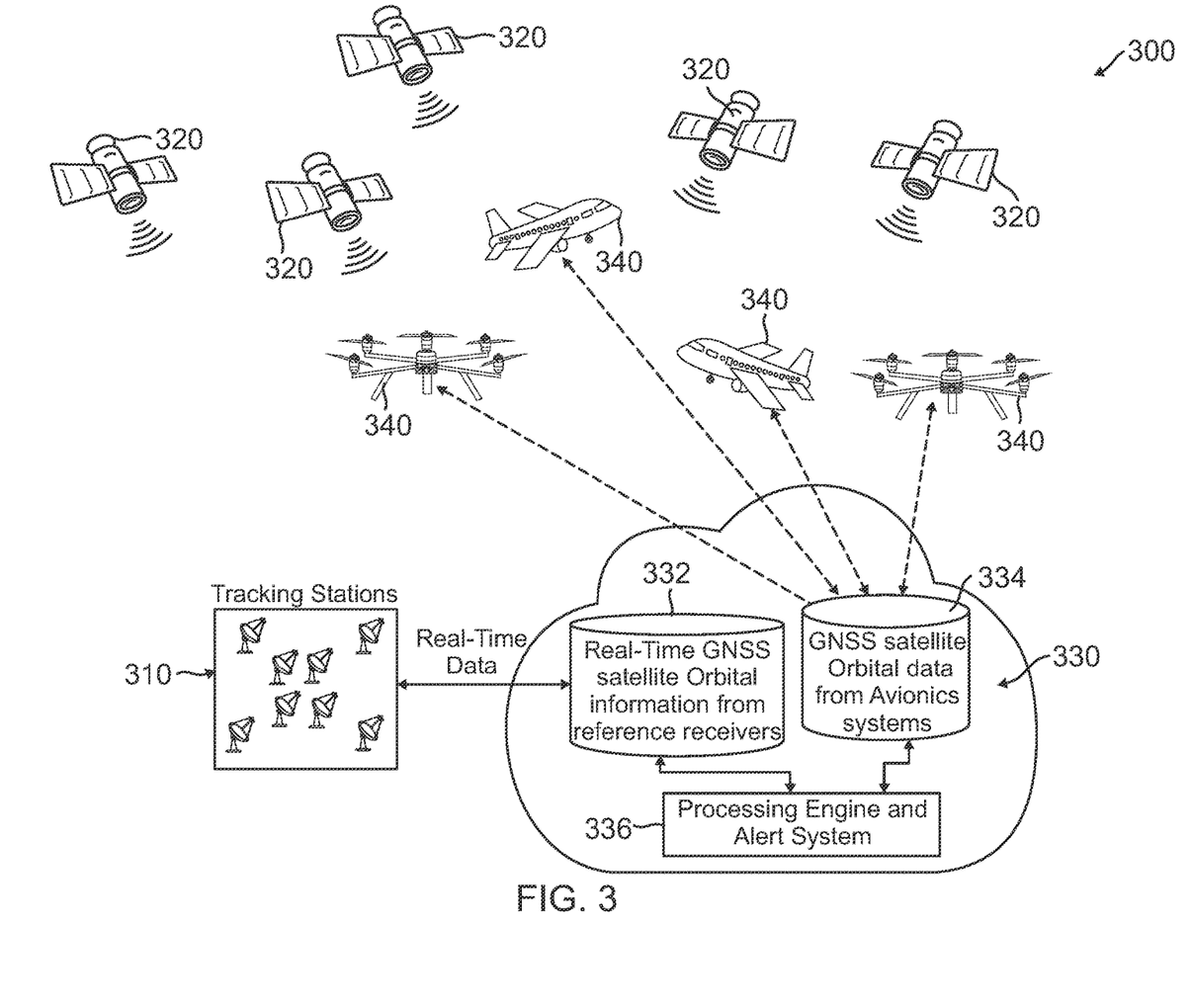
FIG. 3 is a schematic diagram of an exemplary system that can be implemented with the present spoofing detection techniques, according to one embodiment.

FIG. 3 is a schematic diagram of an example system 300, which can be implemented with the present GNSS spoofing detection techniques, according to one embodiment. The system 300 includes a plurality of GNSS tracking stations 310, which can be ground-based. The tracking stations 310 each have reference receivers that are configured to receive and decode real-time GNSS satellite orbital information from a plurality of satellites 320. The satellite orbital information can be received by tracking stations 310 through datalink communication services (e.g., the communication links can be very high frequency (VHF), Satcom, 5G, etc.).

A database and processing system 330, which can be cloud-based or in a processing ground station, is in operative communication with GNSS tracking stations 310. A plurality of aircraft 340 each have GNSS receivers that are configured to receive and decode satellite orbital data from GNSS satellites 320. The aircraft 340 are also in operative communication with database and processing system 330. As illustrated, aircraft 340 can be manned aircraft such as airplanes, or unmanned aircraft such as drones, for example. The aircraft 340 can also include other types of aerial vehicles such as helicopters, UAMs, UAVs, UAS vehicles, or the like.

The database and processing system 330 includes a first orbital information database 332, which stores real-time data corresponding to GNSS satellite orbital information from the reference receivers in tracking stations 310. For example, satellite orbital information received by GNSS tracking stations 310 can be transmitted to orbital information database 332 as real-time data that pertains to the geographical location of each tracking station 310. The database and processing system 330 also can include a second orbital information database 334, which stores decoded satellite orbital data from the avionics systems of each aircraft 340.

A processing engine and alert system 336 is in operative communication with first orbital information database 332 and second orbital information database 334. The processing engine and alert system 336 hosts the present GNSS spoofing detection algorithm, which is operative to compare the orbital data from first orbital information database 332 with the orbital data from second orbital information database 334, to detect GNSS spoofing events and broadcast spoofing alerts.

In system 300, the orbital data comparison in processing engine and alert system 336 is performed on the ground, and thereby spoofing detection pertaining to a specific location can be alerted. Thereby, regulatory agencies, airlines, UAMs, UAVs, and drones can benefit form by the spoofing detection and alerts. In addition, a flight path for an aircraft also can be planned based on this information.

In another implementation, the present method can be used to compare the orbital information within an airborne navigation system (e.g., orbital information from airborne GNSS receiver and accurate orbital information from GNSS tracking stations or IGS, which is received through datalink (VHF, Satcom, 5G, etc.)). In this approach, the present GNSS spoofing detection algorithm is hosted onboard one or more aircraft systems.

In a further implementation, old orbital information can be stored for up to seven days. The present method predicts the orbital information pertaining to a current time, and then compares the predicted orbital information values with current orbital information values decoded by an airborne GNSS receiver. Any GNSS spoofing is detected when there is a difference between the compared values and the difference is beyond a threshold level.

In another implementation, the satellite orbital information values (e.g., velocity, displacement, direction, time) can be predicted approximately using a Kalman filter, and this predicted orbital information can be compared with real-time orbital information values from the GNSS receiver. If the difference in the compared orbital information values is greater that a selected threshold, then spoofing can be detected and declared. This allows for the avoidance of spoofed orbital information, and the coasted/coasting data (prediction model) can help compute the position, with the same being leveraged for a few minutes until the location where spoofing existed has been passed. Then, the satellite position can be used to predict the Doppler shift with respect to the current receiver position and time, which is compared with the Doppler shift generated from GNSS live signals. Any anomaly between the predicted Doppler shift and live Doppler shift can be regarded as a spoofing signal. If the predicted GNSS position based on Kalman filter processing is not matched with the real-time data, then a spoofing signal can cause error in the position computation. An alert can be broadcast that spoofing has been detected.

In a further implementation, the satellite orbital information is available in GNSS ground centers, and can be uploaded to the cloud pertaining to each geographical location. The airborne GNSS receivers in various aircraft can cross compare the uploaded orbital information with the actual received orbital information from satellites in real-time. For example, every few minutes (or as often as appropriate), the real-time orbital information can be compared with Doppler data retrieved from the cloud that applies to the current aircraft location, and thus spoofing detection is possible in that location.

In another implementation, the satellite orbital information received by other aircraft that are away from the ownship by a specified distance (e.g., 100, 1000, or 10000 meters, or as appropriate) can be shared through the cloud, datalink, or the like. The shared orbital information can then be compared, taking the distance information between the aircrafts into account. Thus, the predicted orbital information, DOP, and Doppler shifts can be validated as to whether they are spoofed.

Further, the aircraft position information can be continuously computed using (distance measuring equipment (DME)-DME, DME-VHF omni-directional range (VOR), or inertial navigation systems (INS), and the same also can be compared continuously with GNSS position computations. The aircraft position information also can be received from ADS-B sources. If there is any large differences in the GNSS position computations compared with the aircraft position information, then the GNSS position computations can be doubted, and need to be flagged as unreliable. Other position sources can then be used for navigation purposes. In case of landing, a missed approach can be facilitated with the other position sources to ensure safety.

In addition, unmanned vehicles, such as a UAM vehicles, UAVs, or drones can transmit decoded GNSS satellite orbital information from their GNSS receivers to ground centers. This transmitted orbital information can then be compared with the GNSS satellite orbital information sourced from the ground centers. Any mismatches can be declared as spoofing, and thus regulatory agencies can alert consumers about spoofing activity.

A database can be produced to contain the geographical locations where GNSS spoofing is detected, such that vehicles traveling in the affected locations can benefit by avoiding the use of a GNSS solution and can depend on alternative GPS denied solutions. For example, when GNSS spoofing is detected, this information can be broadcasted and saved in a cloud-based subscription service. Users that subscribe to this service can thus benefit by planning ahead to avoid or use alternate position location solutions in vulnerable areas where the GNSS spoofing exists.

The processing units and/or other computational devices used in systems and methods described herein may be implemented using software, firmware, hardware, or appropriate combinations thereof. The processing unit and/or other computational devices may be supplemented by, or incorporated in, specially designed application-specific integrated circuits (ASICs) or field programmable gate arrays (FPGAs). In some implementations, the processing unit and/or other computational devices may communicate through an additional transceiver with other computing devices outside of the system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

EXAMPLE EMBODIMENTS

Example 1 includes a method for detecting satellite signal spoofing, the method comprising: monitoring one or more satellite signals from one or more satellites with at least one satellite receiver; obtaining a current time and one or more current orbital information values from the at least one satellite receiver, wherein the current one or more orbital information values comprise satellite orbital position, Doppler shift, or dilution of precision, with respect to a current position of the at least one satellite receiver; retrieving one or more past orbital information values, wherein the one or more past orbital information values comprise satellite orbital position, Doppler shift, or dilution of precision; calculating one or more predicted orbital information values based on the one or more past orbital information values, with respect to the current time from the at least one satellite receiver, wherein the one or more predicted orbital information values comprise satellite orbital position, Doppler shift, or dilution of precision, with respect to the current position of the at least one satellite receiver; comparing the one or more predicted orbital information values with the one or more current orbital information values to obtain one or more discriminator values; determining whether the one or more discriminator values are greater than one or more respective threshold levels; and outputting a spoofing alert signal when the one or more discriminator values are greater than the one or more respective threshold levels.

Example 2 includes the method of Example 1, further comprising: determining whether the one or more past orbital information values were updated at a time greater than a time period threshold; if the one or more past orbital information values were updated at a time greater than the time period threshold, then collecting real-time satellite orbital information from the at least one satellite receiver, and storing the real-time satellite orbital information in a memory.

Example 3 includes the method of Example 2, wherein the one or more past orbital information values are updated and stored for different timelines in separate storage locations of the memory.

Example 4 includes the method of any of Examples 1-3, wherein the at least one satellite receiver is located in at least one vehicle comprising an aerial vehicle, a land vehicle, or a sea vehicle.

Example 5 includes the method of Example 4, wherein the aerial vehicle comprises a manned aircraft, a helicopter, an unmanned aerial vehicle (UAV), an unmanned aircraft system (UAS) vehicle, an urban air mobility (UAM) vehicle, or a drone.

Example 6 includes the method of any of Examples 1-5, wherein the at least one satellite receiver is located in at least one ground tracking station in operative communication with a database and processing system, which is cloud-based or in a processing ground station.

Example 7 includes the method of any of Examples 1-6, wherein the one or more past orbital information values are retrieved from the satellite receiver, or from a cloud-based storage database.

Example 8 includes the method of Example 7, wherein the cloud-based storage database contains geographical locations where spoofing is detected.

Example 9 includes the method of any of Examples 4-8, wherein the one or more past orbital information values are obtained from one or more satellite receivers on one or more other vehicles.

Example 10 includes the method of any of Examples 1-9, wherein the spoofing alert signal is broadcast in vulnerable areas where spoofing is detected.

Example 11 includes the method of any of Examples 1-10, wherein the one or more current orbital information values are broadcast to other users that are airborne or on ground.

Example 12 includes the method of any of Examples 1-11, wherein the one or more satellites comprise one or more Global Navigation Satellite System (GNSS) satellites.

Example 13 includes the method of Example 12, wherein the one or more GNSS satellites comprise Global Positioning System (GPS) satellites, GALILEO satellites, BEIDOU satellites, or GLONASS satellites.

Example 14 includes the method of any of Examples 1-13, wherein the one or more satellites comprise one or more Satellite Based Augmentation System (SBAS) satellites.

Example 15 includes a system comprising: at least one processor; a Global Navigation Satellite System (GNSS) spoofing detection module operatively coupled with the at least one processor, the GNSS spoofing detection module including instructions, executable by the at least one processor, to perform a method comprising: monitoring one or more satellite signals from one or more GNSS satellites with at least one GNSS receiver; obtaining a current time and one or more current orbital information values from the GNSS receiver, wherein the one or more current orbital information values comprise satellite orbital position, Doppler shift, or dilution of precision, with respect to a current position of the GNSS receiver; retrieving one or more stored orbital information values comprising satellite orbital position, Doppler shift, or dilution of precision; calculating one or more predicted orbital information values based on the one or more stored orbital information values, with respect to the current time from the GNSS receiver, wherein the one or more predicted orbital information values comprise satellite orbital position, Doppler shift, or dilution of precision, with respect to the current position of the GNSS receiver; comparing the one or more predicted orbital information values with the one or more current orbital information values to obtain one or more discriminator values; determining whether the one or more discriminator values are greater than one or more respective threshold levels; and outputting a spoofing alert signal when the one or more discriminator values are greater than the one or more respective threshold levels.

Example 16 includes the system of Example 15, wherein the GNSS spoofing detection module is hosted in a flight management system (FMS), in a standalone processor, or in the at least one GNSS receiver.

Example 17 includes the system of any of Examples 15-16, wherein the at least one GNSS receiver is located in at least one vehicle comprising an aerial vehicle, a land vehicle, or a sea vehicle.

Example 18 includes the system of any of Examples 15-17, wherein the at least one GNSS receiver is located in at least one ground tracking station in operative communication with a database and processing system, which is cloud-based or in a processing ground station.

Example 19 includes the system of any of Examples 15-18, wherein the one or more GNSS satellites comprise Global Positioning System (GPS) satellites, GALILEO satellites, BEIDOU satellites, or GLONASS satellites.

Example 20 includes a system for detecting satellite signal spoofing, the system comprising: a plurality of satellite tracking stations, wherein the satellite tracking stations each have a respective reference receiver configured to receive and decode real-time satellite orbital information from a plurality of satellites; one or more vehicles each having a respective satellite receiver that is configured to receive and decode satellite orbital data from the satellites; a database and processing system in operative communication with the satellite tracking stations and the one or more vehicles, wherein the database and processing system comprises: a first orbital information database configured to store the real-time satellite orbital information received from the satellite tracking stations; a second orbital information database configured to store the satellite orbital data received from the one or more vehicles; and a processing engine and alert system in operative communication with the first orbital information database and the second orbital information database, wherein the processing engine and alert system hosts a spoofing detection algorithm that is operative to compare the satellite orbital information from the first orbital information database with the satellite orbital data from the second orbital information database, to determine if a satellite signal spoofing event is occurring, and to broadcast a spoofing alert when a spoofing event is detected.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A method for detecting satellite signal spoofing, the method comprising:
monitoring one or more satellite signals from one or more satellites with at least one Global Navigation Satellite System (GNSS) receiver;
collecting satellite orbital information from the at least one GNSS receiver over a preselected time period;
storing the collected satellite orbital information in a memory with time stamps when the GNSS receiver is not under spoofing;

obtaining a current time and current orbital information values from the at least one GNSS receiver, wherein the current orbital information values comprise satellite orbital position, and dilution of precision including satellite geometry and number of satellites in view, and satellite IDs in the view, with respect to a current position of the at least one GNSS receiver;

retrieving past orbital information values from the memory based on the collected satellite orbital information, wherein the past orbital information values comprise satellite orbital position, and dilution of precision including satellite geometry and number of satellites in view, and satellite IDs in the view;

calculating predicted orbital information values based on the past orbital information values, with respect to the current time from the at least one GNSS receiver, wherein the predicted orbital information values comprise predicted orbital position, and predicted dilution of precision including satellite geometry and number of satellites in view, and predicted satellite IDs in the view, with respect to the current position of the at least one GNSS receiver;

comparing the predicted orbital position, and the predicted dilution of precision including satellite geometry and number of satellites in view, respectively, with a current orbital position, and a current dilution of precision including satellite geometry and number of satellites in view, to obtain respective discriminator values;

determining whether the respective discriminator values are greater than respective threshold levels;

determining whether the predicted satellite IDs in the view are different than those in live satellite signals; and outputting a spoofing alert signal when the respective discriminator values are greater than the respective threshold levels, or the predicted satellite IDs are different than those in the live satellite signals.

2. The method of claim 1, further comprising:
determining whether the past orbital information values were updated at a time greater than a time period threshold;
if the past orbital information values were updated at a time greater than the time period threshold, then collecting real-time satellite orbital information from the at least one GNSS receiver, and storing the real-time satellite orbital information in the memory;
wherein the preselected time period for collecting the satellite orbital information is from one day to seven days;
wherein current orbital parameters are filtered and stored in the memory with time stamps when there is no spoofing alert, to ensure that only authentic orbital parameters are stored.

3. The method of claim 2, wherein the past orbital information values are updated and stored for different timelines in separate storage locations of the memory.

4. The method of claim 1, wherein the at least one GNSS receiver is located in at least one vehicle comprising an aerial vehicle, a land vehicle, or a sea vehicle.

5. The method of claim 4, wherein the aerial vehicle comprises a manned aircraft, a helicopter, an unmanned aerial vehicle (UAV), an unmanned aircraft system (UAS) vehicle, an urban air mobility (UAM) vehicle, or a drone.

6. The method of claim 1, wherein the at least one GNSS receiver is located in at least one ground tracking station in operative communication with a database and processing system, which is cloud-based or in a processing ground station.

7. The method of claim 1, wherein the past orbital information values are retrieved from the at least one GNSS receiver, or from a cloud-based storage database.

8. The method of claim 7, wherein the cloud-based storage database contains geographical locations where spoofing is detected.

9. The method of claim 4, wherein the past orbital information values are obtained from one or more GNSS receivers on one or more other vehicles.

10. The method of claim 1, wherein the spoofing alert signal is broadcast where spoofing is detected.

11. The method of claim 1, wherein the current orbital information values are broadcast to other users that are airborne or on ground when under spoofing.

12. The method of claim 1, wherein the one or more satellites comprise one or more GNSS satellites.

13. The method of claim 12, wherein the one or more GNSS satellites comprise Global Positioning System (GPS) satellites, GALILEO satellites, BEIDOU satellites, or GLONASS satellites.

14. The method of claim 1, wherein the one or more satellites comprise one or more Satellite Based Augmentation System (SBAS) satellites.

15. A system comprising:
at least one processor;
a Global Navigation Satellite System (GNSS) spoofing detection module operatively coupled with the at least one processor, the GNSS spoofing detection module including instructions, executable by the at least one processor, to perform a method comprising:
monitoring one or more satellite signals from one or more GNSS satellites with at least one GNSS receiver;
collecting satellite orbital information from the at least one GNSS receiver over a preselected time period;
storing the collected satellite orbital information in a memory;
obtaining a current time and current orbital information values from the at least one GNSS receiver, wherein the current orbital information values comprise satellite orbital position, and dilution of precision including satellite geometry and number of satellites in view, and satellite IDs in the view, with respect to a current position of the at least one GNSS receiver;
retrieving past orbital information values from the memory based on the collected satellite orbital information, the past orbital information values comprising satellite orbital position, and dilution of precision including satellite geometry and number of satellites in view, and satellite IDs in the view;
calculating predicted orbital information values based on the past orbital information values, with respect to the current time from the at least one GNSS receiver, wherein the predicted orbital information values comprise predicted orbital position, and predicted dilution of precision including satellite geometry and number of satellites in view, and predicted satellite IDs in the view, with respect to the current position of the at least one GNSS receiver;
comparing the predicted orbital position, and the predicted dilution of precision including satellite geometry and number of satellites in view, respectively, with a current orbital position, and a current dilution of precision including satellite geometry and number of satellites in view, to obtain respective discriminator values;

determining whether the respective discriminator values are greater than respective threshold levels;

determining whether the predicted satellite IDs in the view are different than those in live satellite signals; and outputting a spoofing alert signal when the respective discriminator values are greater than the respective threshold levels, or the predicted satellite IDs are different than those in the live satellite signal.

16. The system of claim 15, wherein the GNSS spoofing detection module is hosted in a flight management system (FMS), in a standalone processor, or in the at least one GNSS receiver.

17. The system of claim 15, wherein the at least one GNSS receiver is located in at least one vehicle comprising an aerial vehicle, a land vehicle, or a sea vehicle.

18. The system of claim 15, wherein the at least one GNSS receiver is located in at least one ground tracking station in operative communication with a database and processing system, which is cloud-based or in a processing ground station.

19. The system of claim 15, wherein the one or more GNSS satellites comprise Global Positioning System (GPS) satellites, GALILEO satellites, BEIDOU satellites, or GLONASS satellites.

20. A system for detecting satellite signal spoofing, the system comprising:

a plurality of satellite tracking stations, wherein the satellite tracking stations each have a respective reference receiver configured to receive and decode real-time satellite orbital information from a plurality of satellites;

one or more vehicles each having a respective satellite receiver that is configured to receive and decode satellite orbital data from the satellites;

a database and processing system in operative communication with the satellite tracking stations and the one or more vehicles, wherein the database and processing system comprises:

a first orbital information database configured to store the real-time satellite orbital information received from the satellite tracking stations;

a second orbital information database configured to store the satellite orbital data received from the one or more vehicles, wherein the satellite orbital data comprises satellite orbital position, and dilution of precision including satellite geometry and number of satellites in view, and satellite IDs in the view, with respect to a current position of the respective satellite receiver of the one or more vehicles; and a processing engine and alert system in operative communication with the first orbital information database and the second orbital information database, including determining whether predicted satellite IDs in the view are different than those in live satellite signals, wherein the processing engine and alert system hosts a spoofing detection algorithm that is operative to compare the satellite orbital information from the first orbital information database with the satellite orbital data from the second orbital information database, to determine if a satellite signal spoofing event is occurring, and to broadcast a spoofing alert when a spoofing event is detected.

* * * * *